(No Model.) 2 Sheets—Sheet 1.
C. E. ALLSHOUSE.
BINDING IMPLEMENT.
No. 563,542. Patented July 7, 1896.
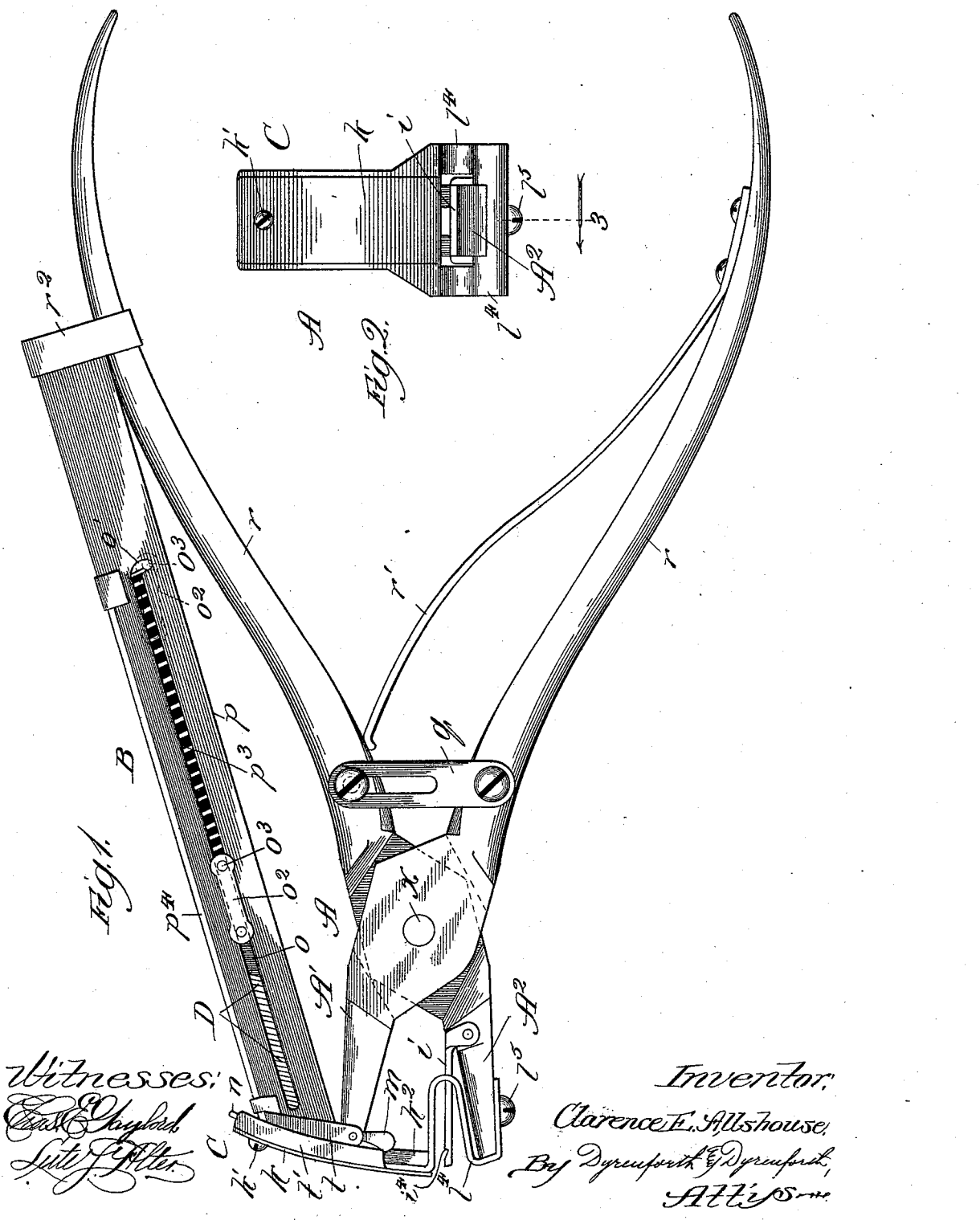

(No Model.) 2 Sheets—Sheet 2.
C. E. ALLSHOUSE.
BINDING IMPLEMENT.
No. 563,542. Patented July 7, 1896.
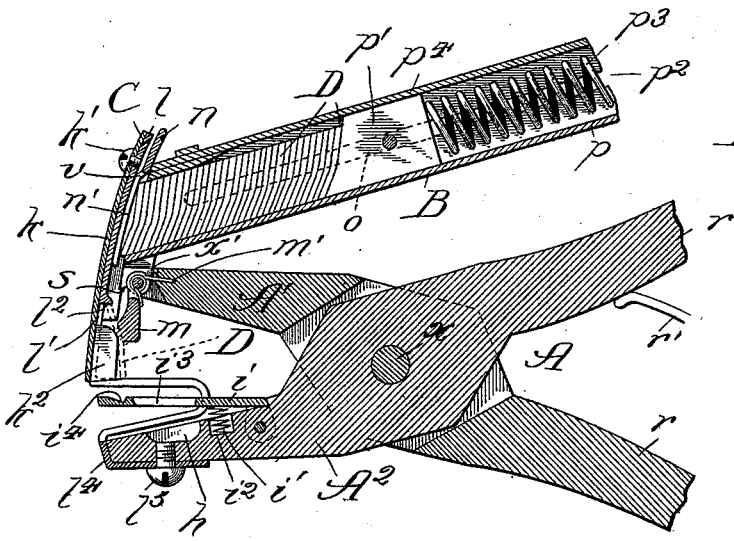
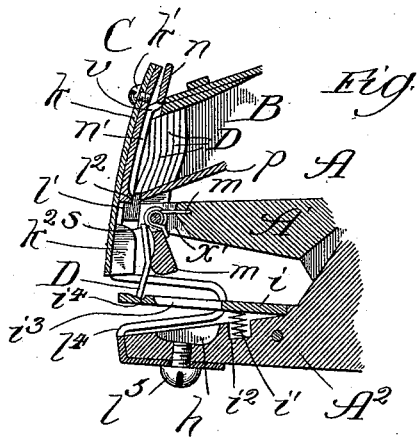
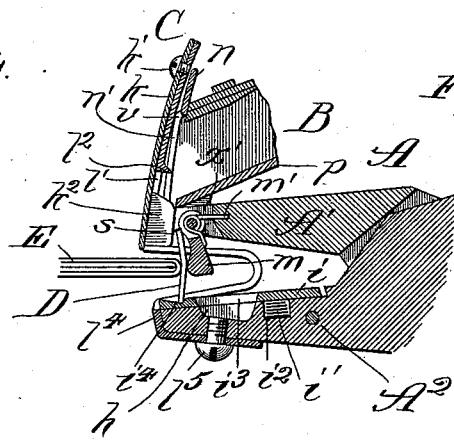
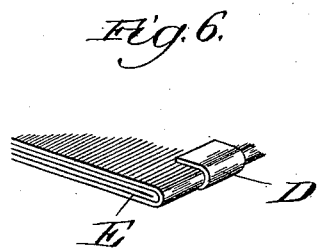
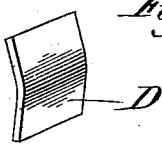
Witnesses:
Inventor:
Clarence E. Allshouse,
By Dyrenforth & Dyrenforth
Attys.

UNITED STATES PATENT OFFICE.

CLARENCE E. ALLSHOUSE, OF CHICAGO, ILLINOIS.

BINDING IMPLEMENT.

SPECIFICATION forming part of Letters Patent No. 563,542, dated July 7, 1896.

Application filed November 22, 1895. Serial No. 569,826. (No model.)

*To all whom it may concern:*

Be it known that I, CLARENCE E. ALLSHOUSE, a citizen of the United States, residing at Chicago, in the county of Cook and State of Illinois, have invented a new and useful Improvement in Binding Implements, of which the following is a specification.

My object is to provide an implement by means of which, more especially, loose papers may be neatly and expeditiously bound or clamped together without perforating or materially marring them by the operation, the clamping medium being of a variety adapting it, while serving to firmly bind the papers at their fold or their edge portions, to be readily withdrawn or slipped off for unbinding.

My improved binding implement involves, as its generally-stated construction, a gripper-tool, and more particularly a hand-grip tool having coöperating jaws and handles for working them, a magazine for containing the clip-blanks affording the binding medium, and means at the jaws for feeding between them, one at a time, the clips to be bent to embrace the edges of the papers inserted between the jaws when the latter are brought together by properly manipulating the handles.

Referring to the accompanying drawings, Figure 1 is a view in side elevation of my improved implement; Fig. 2, a front end view of the same; Fig. 3, a view of a broken section taken at the line 3 on Fig. 2 and viewed in the direction of the arrow, showing the parts in their normal relative positions; Fig. 4, a view like that presented by Fig. 3, but showing only the forward portion of the implement, with a clip-blank brought into position preparatory to closing the jaws to bend the blank; Fig. 5, a similar view showing the jaws partly closed upon a clip-blank and about to bend the latter by further closing the jaws to embrace the edge of a bunch of papers presented to it; Fig. 6, a broken perspective view of a bunch of papers to which a clip has been applied by the binding implement, and Fig. 7 a similar view of the clip in its preferred form.

A is a grip implement, that shown being an ordinary pair of pliers comprising the handles $r$, held normally apart by the interposed spring $r'$, and the jaws $A'$ and $A^2$ forward of the fulcrum $x$. To prevent undue spread of the handles $r$, I show them, in Fig. 1, loosely tied together near the fulcrum $x$ by a slotted link $q$, which limits the play of the handles to the length of the slot.

B is a magazine comprising a tubular receptacle $p$, the cross-sectional shape of which should conform to that of the clip-blanks employed, and a head $p'$ in the tube on the end of a stem $p^2$, surrounded by a spiral spring $p^3$, confined between the rear end of the tube and the head. The sides of the tube $p$ are slotted longitudinally, as shown at $o$, the slots $o$ being provided in opposite sides of the tube and turned to an angle at their outer ends, as shown at $o'$, Fig. 1, for a purpose hereinafter described. Dogs $o^2$ are pivoted at one end to opposite sides of the head $p'$ to extend at the outer sides of the slots $o$, and are provided at their rear ends with studs $o^3$, projecting inward through the slots, whereby when it is desired to set the head in the rear portion of the magazine and lock it against the advancing influence of the spring $p^3$ the latter is compressed by retracting the head till the studs $o^3$ enter the rear portions $o'$ of the slots. The upper side of the receptacle $p$ should be provided with a removable cover $p^4$. At its rear end the receptacle $p$ is loosely fastened to a handle $r$, as by the band $r^2$, and at its forward end it is fastened to the adjacent sides of the extremity of the jaw $A'$, through the wings $t$ of a plate $n$, containing a vertical slot $n'$, the sides of which are slightly in advance of the extremity of the jaw $A'$ and are slightly bulged out in a forward direction near the upper end of the slot, as indicated at $v$, in Figs. 3, 4, and 5. The jaw $A'$ is centrally recessed at $x'$, and in the recess $x'$ is pivotally supported a tongue $m$, controlled by a spring $m'$, the tendency of which is to throw the tongue forward. In advance of the pivot of the tongue $m$ the jaw $A'$ is recessed transversely, as shown at $s$, there to engage the upper end of the clip-blank when brought into position, as hereinafter described.

C is a feed device for transferring the clip-blanks, one at a time, from the magazine B between the jaws $A'$ and $A^2$. As shown, this feed device comprises a plate $l$, bent correspondingly to right angles at its lateral edges to afford wings $t'$, and provided toward its lower end with a vertical slot $l'$, from the upper end of which there projects backward a tooth $l^2$; and the plate $l$ extends from a base $l^4$ of inverted-S shape, adapted to fit over the head of the lower jaw $A^2$, to which it is fastened rigidly, as by a screw $l^5$, that portion of the S-shaped base which extends between the jaws being cut away to or beyond the width of the latter, thus leaving mere V-shaped sides connecting the plate $l$, from its lower edge, with that portion of the base which immediately engages with the jaw $A^2$. On the outer surface of the plate $l$ is fastened, near its upper edge, as by the screw $k'$, a spring-plate $k$, covering the slot $l'$, and carrying on its inner face, to project through that slot, a lug $k^2$, beveled or rounded in a backward direction on its upper end. On the jaw $A^2$ is pivoted, to extend over the upper side of the jaw, from near its inner end, a plate $i$, supported in advance of its pivot on a spring $i'$ in a recess $i^2$ in the jaw, the plate being slotted, as shown at $i^3$, in advance of the spring-support, and the slot $i^3$ extending nearly to a transverse groove $i^4$ in the plate, which is in coöperative relation to the groove $s$ in the jaw $A'$. Below the slot $i^3$ in the plate $i$ the jaw $A^2$ should be recessed, as shown at $h$.

D is the clip-blank in the form in which it is best adapted for use with the particular construction of my improved binding implement shown and described. I form this blank out of a suitable variety of sheet metal, as brass, in rectangular form, with a slight initial directing bend, which renders the blank somewhat concavo-convex. To charge the magazine with its supply of the blanks D, the head or follower $p'$ should be first retracted and locked in its retracted position, as hereinbefore described, when, on removing the cover $p^4$, the clip-blanks are inserted in the relations in which they are shown in Figs. 3 and 4, whereupon the follower $p'$ is released to permit its controlling-spring $p^3$ to force it against the blanks and hold them against the plate $n$. With the magazine thus supplied, the implement is ready to be operated, and its operation is as follows:

By compressing the handles $r$, to bring the jaws $A'$ and $A^2$ together, the feed C is moved past the end of the jaw $A'$, whereby the tooth $l$ moves past the face of the foremost clip-blank, with which it comes into contact through the slot $n'$ in the plate $n$, until the tooth reaches beyond the upper edge of the foremost blank, which it thereupon engages. On then releasing the handles to permit the jaws to separate, the movement of the plate $l$ causes the tooth $l^2$ to carry with it the clip-blank it engages and project it between the tongue $m$ and the lug $k^2$. Thus, with a supply of the clip-blanks in the magazine, there will always be one held between the tongue and the lug preparatory to introducing it between the jaws while another blank is being brought into position. On again bringing the jaws together, the same operation as that described ensues, and the additional one that the frictional contact of the tongue $m$ with the blank carries it to the position in which it is represented in Fig. 4, with its upper edge in the recess $s$ of the jaw $A'$ and its lower edge in the recess $i^4$ of the spring-plate $i$. With the blank in this position, the implement is ready to have the edge of the bunch of papers E to be bound inserted between the jaws, further compression of which causes the blank to force the spring-plate $i$ (which thus affords an intermediary support for the blank) down against the jaw $A^2$, whereupon bringing the jaws together bends the blank to embrace the presented edge of the paper-bunch. It is then that the return of the jaws to their normally-separated condition, by the recoil of the spring $r'$, brings another clip-blank down between the tongue $m$ and the lug $k^2$, ready to be acted on when the jaws are again closed. In the closed condition of the jaws the depending tongue $m$ is prevented from obstructing them by passing through the slot in the plate $i$ into the recess $h$ in the lower jaw.

The initial bend provided in the clip-blank D obviously insures the desired bending action upon it of the implement, though I do not regard the provision of this initial bend as an indispensable feature of my improvement, inasmuch as the implement will bend it in the desired direction, though not so reliably, if the blank is straight. However, it would be a very easy matter to adapt the implement to operate reliably to bend straight clip-blanks. Moreover, my improved binding implement may be otherwise variously modified in its construction without departure from my invention, so I do not limit the same to the particular details shown and described, as I believe it to be broadly new to provide a gripper-tool with a magazine for containing clip-blanks and feeding mechanism, operative by actuating the tool to bring the blanks, one at a time, between the jaws in position to be bent for the purpose set forth by forcing the jaws together.

What I claim as new, and desire to secure by Letters Patent, is—

1. In an implement for binding folded or unfolded sheets together at their fold or their edge portions, the combination of a gripper-tool having coöperating jaws, a magazine for clip-blanks on the tool, discharging near the forward end of the jaws, and a feed device at the forward ends of the jaws and magazine, containing means actuated by opening the jaws to feed a clip-blank into the position of being held at opposite edges between them to present its face to the edge of the matter inserted between the jaws to be bound by closing them to bend the blank upon said edge, substantially as described.

2. In an implement for binding folded or unfolded sheets together at their fold or their edge portions, the combination of a gripper-tool having coöperating jaws, a magazine for clip-blanks on the tool, discharging near the forward end of the jaws, a spring blank-holder between the jaws, and a feed device at the forward ends of the jaws and magazine, actuated by opening the jaws to feed a clip-blank into the position of being held at opposite edges between said holder and one jaw to present its face to the edge of the matter inserted between the jaws to be bound by closing them to bend the blank upon said edge, substantially as described.

3. In an implement for binding folded or unfolded sheets together at their fold or their edge portions, the combination of a gripper-tool having coöperating jaws, a magazine for clip-blanks on the tool, discharging near the forward end of the jaws, and a feed device having a plate secured to one of said jaws and extending past the forward end of the other jaw and discharge end of the magazine and provided with a projecting tooth actuated by opening the jaws to engage a clip-blank presented to it in the magazine and feed said blank into position to be held at opposite edges between the jaws to present its face to the edge of the matter inserted between them to be bound by closing the jaws to bend the blank upon said edge, substantially as described.

4. In an implement for binding folded or unfolded sheets together at their fold or their edge portions, the combination of a gripper-tool having coöperating jaws, a magazine for clip-blanks on the tool, having a slotted covering-plate at its discharge end and containing a spring-controlled follower operating to hold the blanks against said covering-plate, and a feed device having a plate secured to one of said jaws and extending past the forward end of the other jaw and discharge end of the magazine and provided with a projecting tooth actuated by opening the jaws to extend through the slot in said covering-plate and engage a clip-blank presented to it in the magazine and feed said blank into position to be held at opposite edges between the jaws to present its face to the edge of the matter inserted between them to be bound by closing the jaws to bend the blank upon said edge, substantially as described.

5. In a binding implement, the combination of a gripper-tool having coöperating jaws, a magazine for clip-blanks on the tool and discharging near the forward end of the jaws, and a feed device comprising a slotted plate secured to one of said jaws and extending past the forward end of the other jaw and discharge end of the magazine and provided with a tooth projecting to engage the clip-blank presented to it in the magazine, a spring-plate on said slotted plate, carrying a lug projecting through the slot, and a spring-tongue pivoted on one of the jaws to coöperate with said lug, substantially as and for the purpose set forth.

6. In a binding implement, the combination of a gripper-tool having coöperating jaws $A'$ and $A^2$, a magazine for clip-blanks on the tool, having a slotted covering-plate $n$ at its discharge end and containing a spring-controlled follower $p'$ operating to hold the blanks against said covering-plate, a slotted spring blank-holder $i$ pivoted to the jaw $A^2$, and a feed device C comprising a slotted plate $l$ secured to the jaw $A^2$ and provided with a tooth $l^2$, a spring-plate $k$ on said slotted plate carrying a lug $k^2$ projecting through the slot, and a spring-tongue $m$ pivoted to the jaw $A'$ to coöperate with said lug, the whole being constructed and arranged to operate substantially as described.

7. In a binding implement, the combination with a hand-grip tool A of a magazine B secured on the tool and comprising a receptacle $p$ provided with a removable cover and having in its sides slots $o$ diverted at their ends, as at $o'$, a spring-controlled follower $p'$ in the receptacle, and dogs $o^2$ engaging the follower through said slots, by which to retract and lock it therein, substantially as and for the purpose set forth.

CLARENCE E. ALLSHOUSE.

In presence of—
J. H. LEE,
J. N. HANSON.